No. 816,264.  
PATENTED MAR. 27, 1906.  
W. E. SOPER.  
LEADER LINK.  
APPLICATION FILED AUG. 12, 1905.

Witnesses  
Inventor  
William E. Soper.  
By his Attorneys

UNITED STATES PATENT OFFICE.

WILLIAM E. SOPER, OF YONKERS, NEW YORK.

LEADER-LINK.

No. 816,264.  Specification of Letters Patent.  Patented March 27, 1906.

Application filed August 12, 1905. Serial No. 273,865.

*To all whom it may concern:*

Be it known that I, WILLIAM E. SOPER, a citizen of the United States, residing at Yonkers, in the county of Westchester and State of New York, have invented certain new and useful Improvements in Leader-Links, of which the following is a full, clear, and exact description.

My invention relates to a form of leader-link for fishing-tackle.

Under certain conditions, and particularly in deep-sea fishing, it is desirable to employ a number of hooks upon a single line which are conveniently disposed at intervals along the same so as to be suspended at varying distances from the bottom. The application of such supplemental hooks along the length of the line is ordinarily effected by tying or knotting the line at the various points. This renders it impossible to move the hooks from place to place along the line or to remove the same without cutting.

The object of my invention is to provide a leader-link which shall be readily attachable without knotting or tying to any point along the length of a line and which can be instantly removed or shifted to another position whenever desired.

I further contemplate the use of my invention for the attachment of sinkers, floats, and other fishing paraphernalia to points along the body of a line.

With these and other objects in view my invention consists in the construction, combination, location, and arrangement of parts, all as will be more fully hereinafter set forth, as shown in the accompanying drawings, and finally particularly pointed out in the appended claims.

Figure 1:
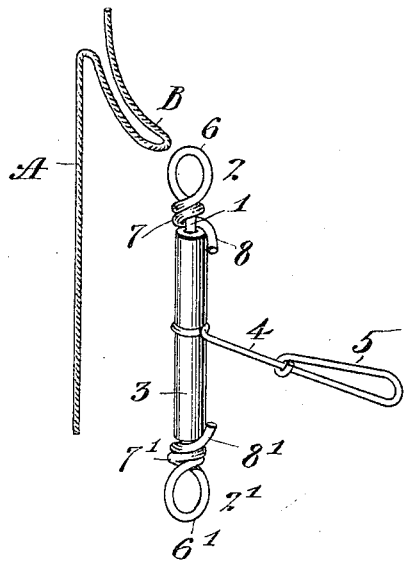
Figure 2:
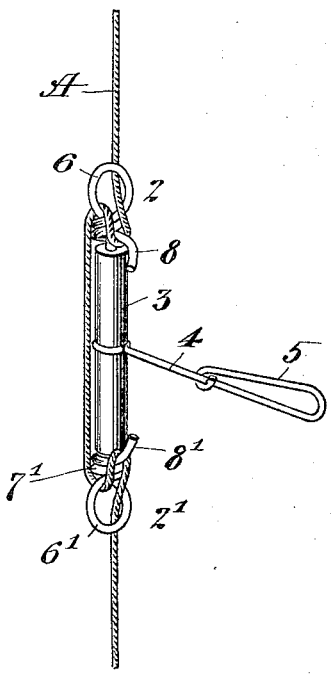

In the drawings, Figure 1 is a perspective view showing a leader-link embodying the principles of my invention in position for its attachment to a line. Fig. 2 illustrates the same after it has been secured to the line.

The ordinary leader-link comprises a stem having an eye at each end and a swiveled arm thereon, also having an eye to which the usual catgut leader of the hook is attached. By this means the hook is hung freely, so as to swing away from the line. The leader-link constructed in accordance with my invention secures all these features and in addition the feature of being readily attachable and easily removed.

Referring to the drawings, 1 indicates the stem of the appliance, which I shall term the "main supporting-spindle," and I prefer to form this part of a single piece of wire which is bent in a special way at each end into line-attaching heads, (broadly designated in the drawings as 2 2'.)

3 indicates a sleeve which is loosely revoluble on the main supporting-spindle 1 and carries the usual laterally-projecting arm 4, having a hook or eye 5 thereon to which the usual catgut leader is secured. The construction of the sleeve and its laterally-projecting arm form, however, no part of my present invention and need not, therefore, be further considered in this case.

I may form the line-attaching heads 2 2' in various ways to secure the functions hereinafter stated; but I prefer to make use of the material of the main supporting-spindle which can be readily bent to secure a practical construction of the line-attaching head. For this purpose the wire 1 is bent around into a circular or curved form at its upper and lower ends, so as to produce eyes 6 6', each large enough to receive a loop of the line.

Instead of terminating the wire with the completion of the eyes 6 6' at each end I carry each such terminal end in a plurality of turns or convolutions 7 7' about the main spindle 1 and finally form what I shall term "retaining-hooks" 8 8'. In their preferred form these hooks comprise lateral projections on the main supporting-spindle, which may be directed toward the opposite end of the spindle, as shown in the drawings. While I have illustrated and described this special way of forming the line-attaching heads, I do not desire to be limited or restricted thereto, since it is evident that many other forms of construction may be used, it being merely essential to provide the pair of laterally-projecting hooks to coöperate with the eyes at the ends of the main supporting-spindle.

The manner of use of my invention is as follows: It being desired to attach the leader-link to a line indicated at A in the drawings, the latter is looped into a slender projecting section B, adapted to be directed into the eye 6. The loop is now inserted into the eye, being downwardly directed therein, so as to eventually lie over the hook 8, under which it is then engaged. It is then merely necessary to draw the two ends of the line taut, by which it takes such an engagement or bight with the head that while it may be pulled upward through the eye with a certain amount of force a downward movement is almost absolutely prevented. After this the line is again looped at a point lower down and passed through the eye 6' and engaged with the hook 8' in a manner exactly similar to its engagement with the hook 8, above described. The lower portion of the line may now be pulled taut in a downward direction, in which it is movable, until it draws up on the eye 6, after which any further movement is impossible. In a similar way the head 2' utterly prevents the line from being drawn upward through the eye 6, and so the leader-link is immovably secured to the line without any cutting or knotting of the latter or other injury of any sort.

A feature of my invention resides in the manner in which the line is carried past the sleeve 3. By virtue of the spiral turns or convolutions 7 7' the line is held a minute distance away from the sleeve 3, as clearly illustrated in Fig. 2, so that the sleeve is free to swivel and fulfil all the functions of a proper leader-link.

While I have shown and described my invention in conjunction with a leader-link, it is obvious that its use is not limited thereto, since line-attaching heads constructed in accordance with my invention may be employed with sinkers, floats, and all other paraphernalia which it is desired to attach to a fishing-line.

Throughout this specification and in the following claims I have employed the term "leader-link" to describe my appliance; but it is to be understood that I desire to include within the scope of this term all the other paraphernalia—such as floats, sinkers, &c.—above referred to.

What I claim is—

1. A leader-link comprising a main supporting-spindle having an eye at each end, and a pair of lateral projections thereon.

2. A leader-link comprising a main supporting-spindle having an eye at each end, and a pair of hooks substantially in the axial planes of said eyes.

3. A leader-link comprising a main supporting-spindle formed of a single piece of wire, said wire being bent into an eye at each end of the spindle and terminating in lateral projections.

4. A leader-link comprising a main supporting-spindle formed of a single piece of wire, said wire being bent into an eye at each end of the spindle and terminating in laterally-projecting hooks.

5. A leader-link comprising a main supporting-stem having its ends bent into a circular or curved form to produce eyes, the terminal portions of the material being wrapped around the body of the stem and terminating in a pair of laterally-projecting hooks.

6. In a leader-link, a sleeve having a laterally-projecting arm carrying an eye, and a main supporting-spindle loosely swiveled on said sleeve and having an eye at each end and a pair of laterally-projecting hooks.

7. In an attachment for fishing-lines and the like, a main supporting-spindle bent to form an eye at each end, and having terminal portions forming hooks.

In witness whereof I subscribe my signature in the presence of two witnesses.

WILLIAM E. SOPER.

Witnesses:
 FRANK S. OBER,
 WALDO M. CHAPIN.